United States Patent
Bitar et al.

[11] Patent Number: 5,928,322
[45] Date of Patent: Jul. 27, 1999

[54] LOW-LATENCY REAL-TIME DISPATCHING IN GENERAL PURPOSE MULTIPROCESSOR SYSTEMS

[75] Inventors: Nawaf K. Bitar, San Jose; Rajagopal Ananthanarayanan, Sunnyvale; Robert M. English, Menlo Park, all of Calif.

[73] Assignee: Silicon Graphics, Inc., Mountain View, Calif.

[21] Appl. No.: 08/752,925

[22] Filed: Nov. 20, 1996

[51] Int. Cl.$^6$ .................................................... G06F 9/46
[52] U.S. Cl. ..................................................... 709/4; 709/3
[58] Field of Search ........................ 395/733, 672, 395/635, 677, 595, 736, 200.53, 673

[56] References Cited

U.S. PATENT DOCUMENTS

| | | | |
|---|---|---|---|
| 5,159,686 | 10/1992 | Chastain et al. | 395/675 |
| 5,339,415 | 8/1994 | Strout, II et al. | 395/672 |
| 5,357,617 | 10/1994 | Davis et al. | 395/595 |
| 5,438,677 | 8/1995 | Adams et al. | 395/736 |
| 5,487,167 | 1/1996 | Dinallo et al. | 345/302 |
| 5,515,538 | 5/1996 | Kleiman | 395/733 |
| 5,544,051 | 8/1996 | Senn et al. | 707/3 |
| 5,634,070 | 5/1997 | Robinson | 395/800.28 |
| 5,694,603 | 12/1997 | Reiffin | 395/677 |
| 5,721,922 | 2/1998 | Dingwall | 395/673 |

OTHER PUBLICATIONS

Dynamic scheduling of hard real–time tasks and real–time threads by Schwan et al., 1992 IEEE publication, pp. 736–748.

*Primary Examiner*—Zarni Maung
*Attorney, Agent, or Firm*—Schwegman, Lundberg, Woessner, and Kluth, P.A.

[57] ABSTRACT

A low-latency real-time dispatching scheme performed by the operating system of a general purpose multiprocessor system having N processors, assigns a priority to each of multiple real-time threads to be executed on the N processors. The multiple real-time threads include up to N top priority real-time threads, which are bound to a corresponding processor. The assigned priority of each bound real-time thread is the highest priority for being executed on its corresponding processor, and any other real-time thread being executed on the corresponding processor is preempted if the bound real-time thread becomes runnable.

21 Claims, 1 Drawing Sheet

LOW-LATENCY REAL-TIME DISPATCHING IN GENERAL PURPOSE MULTIPROCESSOR SYSTEMS

THE FIELD OF THE INVENTION

The present invention relates generally to computer systems, and in particular to real-time dispatching of threads in a general purpose multiprocessor system.

BACKGROUND OF THE INVENTION

Computer systems supporting priority-scheduled real-time threads or jobs need to guarantee low-latency dispatching of the real-time threads. Latency is the time taken from the instant at which a real-time event, such as an interrupt, occurs to the instant at which the real-time thread handling the event is executing so that the real-time thread is able to process the real-time event. General purpose multiprocessor computer systems, which guarantee low-latency for real-time threads, need to efficiently identify the real-time thread to handle the real-time event and efficiently dispatch the real-time thread to an appropriate processor.

Conventional computer systems supporting real-time threads typically achieve the required low-latency real-time thread dispatching by either restricting the workload the computer system handles by assuming embedded, special purpose kernels, or by statically partitioning a multiprocessor computer system such that some of the processors in the system are dedicated to real-time threads. Nevertheless, an embedded multiprocessor computer system is not feasible in a general purpose system in light of the ever-increasing multimedia-based software that relies on real-time aspects of a computer system. On the other hand, a statically partitioned multiprocessor system tends to waste resources due to the static partitioning.

Another previous general purpose multiprocessor system attempts to achieve low-latency real-time thread dispatching by maintaining a global queue which contains threads ordered by priority. Once a real-time thread becomes runnable as the result of the occurrence of a real-time event, the real-time thread is queued onto the global queue. The queued real-time thread immediately gets picked up by an idle processor, if such an idle processor is available. However, if none of the processors in the multiprocessor system are idle, then a suitable processor is selected as part of the dispatching algorithm. The selected processor is then interrupted to enable the selected processor to pick up the queued real-time thread.

In a general purpose multiprocessor system employing the above priority scheme, selecting an appropriate processor to process the queued real-time thread is a complex decision and must be performed carefully. To illustrate the complexity of the selection process, the following example scenario is provided. In the example, a two processor system includes one processor running a real-time thread (RT1) and a second processor running a non-real-time or time-share thread (TS1). If another real-time thread (RT2) becomes runnable due to the occurrence of a real-time event, RT2 should replace TS1 and not RT1. In this scenario, a dispatching algorithm must keep track of which processors are running real-time threads and which processors are running non-real-time threads. In general, each processor maintains the priority of the thread that the processor is currently executing to support correct scheduling of real-time threads. As part of dispatching, a real-time thread (RTx), a target processor is found by finding the processor (P) with the lowest priority (p). Then, RTx is switched onto P if the priority of RTx is greater than p. If a target processor cannot be found, then RTx is enqueued onto the global queue. Then, when a processor becomes idle, the idle processor is able to pick up RTx from the global queue.

This last described scheme of keeping track of priorities for each processor is very inefficient and slows the operation of the whole general purpose multiprocessor system. First, the priority needs to be updated every time a real-time thread is switched into and out of a processor. Second, when a target processor needs to be determined, the dispatching of a real-time thread includes looking at all the processors' priority to determine a suitable processor. Since multiple dispatches can occur simultaneously, care must be taken to avoid two different dispatches selecting the same processor. As a result, the accessing of priorities of the different processors must be synchronized, or suitable back off schemes must be executed in the event that the same processor is selected in two concurrent dispatches. Both of these techniques are inefficient. For example, the locking to maintain the priorities on thread switches can become contentious.

Therefore, for the reasons stated above, and for other reasons presented in greater detail in the Description of the Preferred Embodiments section of the present specification, there is a need for an improved low-latency real-time thread dispatching mechanism in a general purpose multiprocessor system.

SUMMARY OF THE INVENTION

The present invention provides a method of real-time dispatching in a general purpose multiprocessor system having N processors. A priority is assigned to each of the multiple real-time threads to be executed on ones of the N processors. The multiple real-time threads include up to N top priority real-time threads. Each of the up to top N priority real-time threads are bound to a corresponding processor. The assigned priority of each bound real-time thread is the highest priority for being executed on its corresponding processor, and any other thread being executed on the corresponding processor is preempted if the bound real-time thread becomes runnable.

In one embodiment of the present invention unbound real-time threads not in the top N priority real-time threads are queued in a global queue if there are no available processors for executing all real-time threads. The global queue is preferably available for access by all of the N processors. In addition, time-share threads are queued in a time-share queue if there are no available processors for the executing time-share threads. The time-share threads in the time-share queue all have lower priorities than the unbound real-time threads in the global queue. The time-share queue is also preferably available for access by all of the N processors.

The bindings of the real-time threads are preferably re-evaluated based on certain non-latency critical events such as creation of new threads, destruction of existing threads, and when priorities of the real-time threads are changed. If the priority of a new real-time thread is greater than the priority of one of the previous top N priority real-time threads, the binding of the lowest priority bound real-time thread is released from its corresponding processor, and the new real-time thread is bound to that corresponding processor. When one of the bound real-time threads is destroyed, the highest priority unbound real-time thread in the multiprocessor system is bound to that corresponding processor. When at least one of the real-time thread's priority is changed to result in the priority of at least one unbound real-time thread being greater than the priority of at least one of the previous top N priority real-time threads, then the binding of the at least one lowest priority bound real-time thread is released from its corresponding processor, and the at least one unbound real-time thread is bound to that corresponding processor.

The general purpose multiprocessor system according to the present invention efficiently handles real-time dispatching by ameliorating the previous problems of previous general purpose multiprocessor systems related to maintaining priorities by actually selecting and maintaining the priorities on non-latency critical events. Furthermore, the top N priority real-time threads in the N processor system according to the present invention have extremely low-latency times due to the fact that the top N priority real-time threads are each bound to one processor so that no search or query to a global queue or global state is necessary. Instead, a bound real-time thread is directly dispatched to its bound processor and quickly proceeds to begin executing to process its associated real-time event.

Another benefit obtained with the low-latency real-time dispatching binding scheme of the present invention is that the bound processors can better take advantage of cache affinity. In the previous general purpose multiprocessor systems, the real-time threads always are put on a global queue under the assumption that whenever a processor becomes available, any processor can pick threads off the global queue. As a result, in the previous systems, a real-time thread gets scheduled over possibly many processors. By contrast, with the binding scheme of the present invention, the bound real-time threads always go back to the same processor that they are bound to and, therefore, that same processors' cache tends to be warmer.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
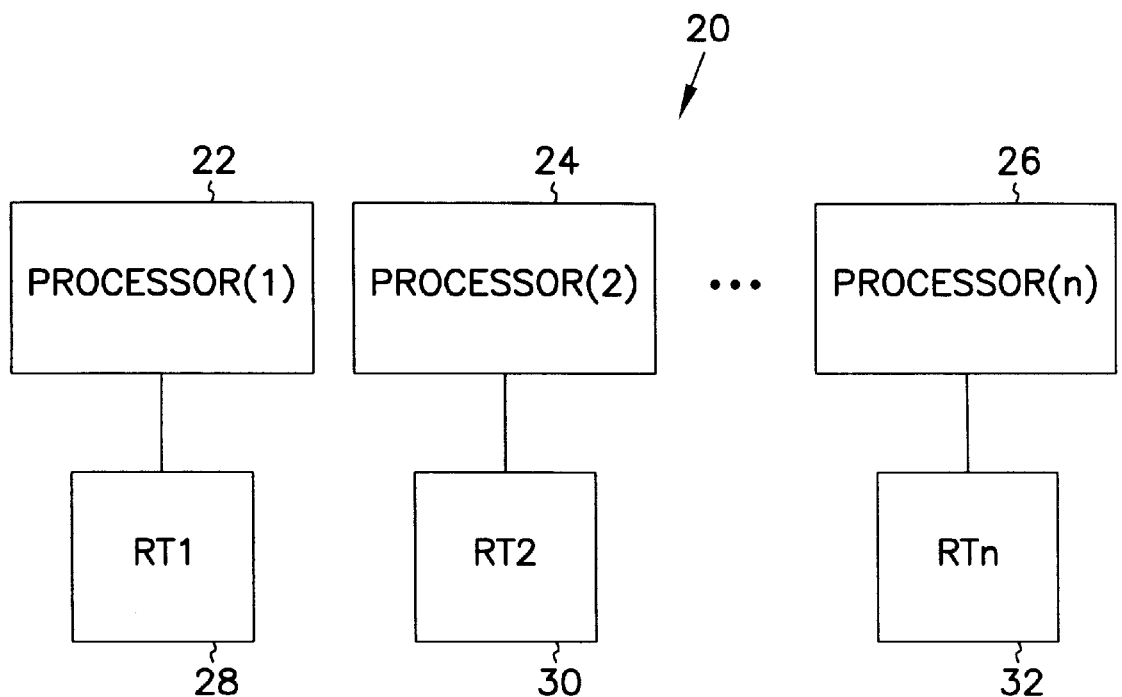
FIG. 1 is a block diagram illustrating a general purpose multiprocessor system having a low-latency real-time thread dispatching scheme according to the present invention.

A general purpose multiprocessor system, which achieves low-latency real-time thread dispatching according to the present invention, is illustrated generally at 20 in FIG. 1. General purpose multiprocessor system 20 includes N processors such as processor (1) indicated at 22, processor (2) indicated at 24, and processor (n) indicated at 26. The top N priority real-time threads are selected (e.g., RT1, RT2, . . . RTn). Each of the top N priority real-time threads is bound to one processor in general purpose multiprocessor system 20. As illustrated in FIG. 1, RT1, indicated at 28, is bound to processor (1), indicated at 22. RT2, indicated at 30, is bound to processor (2), indicated at 24, and RTn, indicated at 32, is bound to processor (n), indicated at 26.

When a new real-time thread is created, the existing bindings are reevaluated, and if the new real-time thread has sufficiently high priority, then one of the existing bindings to one of the processors is broken and that one processor is assigned or bound to the new real-time thread. Similarly, when a real-time thread is destroyed, if there are any real-time threads that are not bound, then the binding released by the destroyed real-time thread is assigned to the real-time thread with the highest priority among the real-time threads that are not bound.

Changes to the priority of one or more real-time threads is another event that can affect a real-time thread's state of binding. When the priority of a previously unbound real-time thread is increased, that real-time thread may now be eligible to acquire a binding. On the other hand, a previously bound real-time thread may be required to relinquish its binding when the priority of that bound real-time thread is decreased. Initially, general purpose multiprocessor system 20 contains no real-time threads. Thus, at start-up, none of the processors of general purpose multiprocessor system 20 is bound.

Figures 2A, 2B:
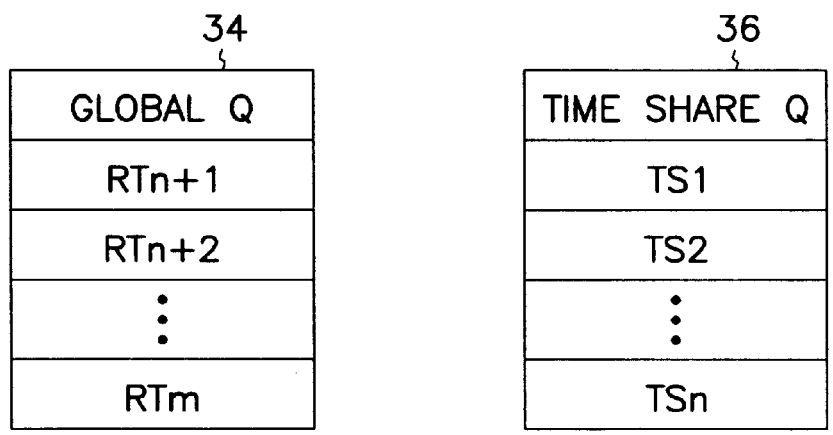
FIGS. 2A is a diagram of a global queue employed in the general purpose multiprocessor system of FIG. 1.
FIGS. 2B is a diagram of a time-share queue employed in the general purpose multiprocessor system of FIG. 1.

Unbound real-time threads are stored in a global overflow queue, which is preferably accessible by all processors of general purpose multiprocessor system 20, such as global queue 34 illustrated in FIG. 2A. As illustrated in FIG. 2A, global queue 34 includes the real-time thread with the $(N+1)^{th}$ top priority (RTn+1) and the other lower priority real-time threads, such as RTn+2 through RTm. Additionally, a time-share queue 36 illustrated in FIG. 2B, which is preferably accessible by all processors of general purpose multiprocessor system 20, stores the non-real-time or time-share threads, such as indicated by TS1 through Tsn. Thus, the threads running in general purpose multiprocessor system 20 employ a three tier priority which has the following order of priority: 1) the bound top N priority real-time threads, which are guaranteed access to their corresponding bound processors; 2) the unbound real-time threads stored in global queue 34; and 3) the non-real-time-threads or time-share threads stored in time-share queue 36.

A bound real-time thread is dispatched by enqueueing the real-time thread onto a processor-specific data structure and interrupting the processor. Since a real-time thread with a high enough priority to be in the top N priority real-time threads of general purpose multiprocessor system 20 is necessarily bound, dispatching such a real-time thread involves minimal overhead.

The binding scheme of the present invention is very efficient because the top N priority real-time threads are "pre-sorted" at the time of dispatch, so that no searching needs to be performed for these real-time threads. Priorities are selected and maintained on non-latency critical events. In real-time systems, latency is critical only in response to external events, such as interrupts. Creating and destroying real-time threads and changing the priority of a real-time thread are all non-latency critical events. For example, a network video tool does not require latency critical dispatching until it is fully started (thread creation), but does require latency critical dispatching once the network video tool is up and running in order to process network packets in time.

In general purpose multiprocessor system 20 having an operating system implementing the binding scheme according to the present invention, only the latency of the top N real-time threads is guaranteed. Therefore, the pre-sorting of the real-time threads does not compromise the capability of general purpose multiprocessor system 20. The pre-sorting is performed at non-latency critical events including real-time thread creation, destruction, and at priority changes, all of which happen during the setup of applications, which in itself does not require latency guarantees. Since the top N real-time threads are pre-sorted, general purpose multiprocessor system 20 Guarantees that the top N real-time threads have a binding. This, in turn, guarantees that each of these top N priority real-time threads is guaranteed to find a processor, to which the real-time thread is bound, when the real-time thread becomes runnable as a result of the occurrence of a real-time event. When dispatching a bound real-time thread that becomes runnable, general purpose multiprocessor system 20 can safely preempt any real-time or time-share thread that is already running on the bound processor, because any real-time thread with a binding is guaranteed to have higher priority than any other thread that is not bound. Moreover, bindings do not overlap.

A better understanding of the present invention is obtained by considering the example scenario described in the Background of the Invention section of the present specification where a two processor system includes one processor (processor 1) running a real-time thread (RT1) and another processor (processor 2) running a non-real-time thread or time-share thread (TS1). When another real-time thread (RT2) becomes runnable, RT2 should replace TS1 and not RT1. In the previous general purpose multiprocessor system described in the Background of the Invention section, the system must track which processor is running real-time threads and which one is running non-real-time threads, keep track of priorities of each thread, and at dispatch time, search all processors' priority to determine a suitable processor. Moreover, the previous general processor system must synchronize the accessing of priorities, or provide a suitable back off scheme, in the event that the same processor is selected in two concurrent dispatches. These problems of such a previous general purpose multiprocessor system are greatly exasperated as the number of processors in the system increases.

By contrast, at the time of creating the real-time threads, a two processor system employing the binding scheme according to the present invention assigns the bindings as follows: RT1 is bound to processor 1; and RT2 is bound to processor 2. The time-share thread TS1 is not bound, since it has a lower priority than real-time threads. When TS1 is running on processor 2, since bound threads run only on their bound processor, RT1 is running on processor 1. When RT2 becomes runnable, RT2 is directly dispatched onto processor 2 without having to look at processor 1. Since RT2 has a binding, the processor that RT2 is bound to (processor 2) cannot be running any thread that has a higher priority than RT2. This also follows from the fact that bindings are distinct, and that RT1 in the above scenario is bound to processor 1. This example with a two processor system can be easily scaled to a larger number of processors, up to N processors having up to N bound real-time threads, and additional unbound real-time threads and time-share threads.

Another benefit obtained with the low-latency real-time dispatching using bindings according to the present invention is that the bound processors can better take advantage of cache affinity. In the previous real-time dispatching scheme in a general purpose multiprocessor system described in the Background of the Invention section, the real-time threads always are put on a global queue under the assumption that whenever a processor becomes available, any processor can pick threads off the global queue. As a result, in the previous scheme, a real-time thread gets scheduled over possibly many processors. By contrast, with the binding scheme of the present invention, the bound real-time threads always go back to the same processor that they are bound to and, therefore, that same processors' cache tends to be warmer.

CONCLUSION

The low-latency real-time dispatching performed in a general purpose multiprocessor system with the binding scheme according to the present invention provides a very efficient way of handling real-time dispatching by ameliorating the previous problems in the art related to maintaining priorities by actually selecting and maintaining the priorities on non-latency critical events. Moreover, the top N priority real-time threads in a N processor system have extremely low-latency times due to the invarient fact that the top N priority real-time threads are each bound to one processor so that no search or query to a global queue is necessary. Instead, a bound real-time thread is directly dispatched to its bound processor and quickly proceeds to begin executing to process its associated real-time event.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of real-time dispatching in a general purpose multiprocessor system having N processors, the method comprising:

assigning a priority to each of the multiple real-time threads to be executed on one of the N processors, such that the multiple real-time threads include up to N top priority real-time threads; and binding each of the up to top N priority real-time threads to a corresponding processor such that the assigned priority of each bound real-time thread is the highest priority for being executed on its corresponding processor and any other thread being executed on the corresponding processor is preempted if the bound real-time thread becomes runnable, wherein binding includes:

preallocating a processor to each one of the N top priority real-time threads; and dispatching the bound real-time thread to its preallocated processor when the real-time thread becomes runnable.

2. The method of claim 1 further comprising queuing unbound real-time threads not in the top N priority real-time threads in a global queue available for access by all of the N processors if there is not available processors for the executing all real-time threads.

3. The method of claim 2 further comprising queuing time-share threads in a time-share queue available for access by all of the N processors if there is not available processors for the executing time-share threads, wherein the time-share threads in the time-share queue all have lower priorities than the unbound real-time threads in the global queue.

4. The method of claim 2 further comprising searching for an available processor for executing the unbound queued real-time threads.

5. The method of claim 1 further comprising:
destroying one of the bound real-time threads; and
binding a highest priority unbound real-time thread in the general purpose multiprocessor system to said corresponding processor.

6. A method of real-time dispatching in a general purpose multiprocessor system having N processors, the method comprising:
assigning a priority to each of the multiple real-time threads to be executed on ones of the N processors, such that the multiple real-time threads include up to N top priority real-time threads;
binding each of the up to top N priority real-time threads to a corresponding processor such that the assigned priority of each bound real-time thread is the highest priority for being executed on its corresponding processor and any other thread being executed on the corresponding processor is preempted if the bound real-time thread becomes runnable;
creating a new real-time thread having an assigned priority;
re-evaluating the assigned priorities of the real-time threads to ascertain if the priority of the new real-time thread is greater than the priority of one of the previous top N priority real-time threads; and
if the priority of the new real-time thread is greater than the priority of one of the previous top N priority real-time threads:
breaking the binding of the lowest priority bound real-time thread from its corresponding processor; and
binding the new real-time thread to said corresponding processor.

7. The method of claim 6, wherein assigning a priority includes queuing unbound real-time threads not in the top N priority real-time threads in a global queue available for access by all of the N processors.

8. The method of claim 7, wherein assigning a priority further includes queuing timeshare threads in a time-share queue available for access by all of the N processors, wherein the time-share threads in the time-share queue all have lower priorities than the unbound real-time threads in the global queue.

9. A method of real-time dispatching in a general purpose multiprocessor system having N processors, the method comprising:
assigning a priority to each of the multiple real-time threads to be executed on ones of the N processors, such that the multiple real-time threads include up to N top priority real-time threads; and
binding each of the up to top N priority real-time threads to a corresponding processor such that the assigned priority of each bound real-time thread is the highest priority for being executed on its corresponding processor and any other thread being executed on the corresponding processor is preempted if the bound real-time thread becomes runnable;
assigning a new priority to at least one of the real-time threads;
reevaluating the assigned priorities of the real-time threads to ascertain if the priority of at least one unbound real-time thread is greater than the priority of at least one of the previous top N priority real-time threads as a result of assigning a new priority; and
if the priority of the at least one unbound real-time thread is greater than the priority of the at least one of the previous top N priority real-time threads:
breaking the binding of the at least one lowest priority bound real-time thread from its corresponding processor; and
binding the at least one unbound real-time thread to said corresponding processor.

10. The method of claim 9, wherein assigning a priority includes queuing unbound real-time threads not in the top N priority real-time threads in a global queue available for access by all of the N processors.

11. The method of claim 10, wherein assigning a priority further includes queuing timeshare threads in a time-share queue available for access by all of the N processors, wherein the time-share threads in the time-share queue all have lower priorities than the unbound real-time threads in the global queue.

12. A method of real-time dispatching in a general purpose multiprocessor system having a first processor and a second processor, the method comprising:
binding a first real-time thread to the first processor such that the first real-time thread has the highest priority for being executed on the first processor and any other thread being executed on the first processor is preempted if the first real-time thread becomes runnable; and
binding a second real-time thread to the second processor such that the second real-time thread has the highest priority for being executed on the second processor and any other thread being executed on the second processor is preempted if the second real-time thread becomes runnable wherein binding of said first and second real-time threads includes preallocating the first and second processors to the first and second real-time threads, respectively.

13. A general purpose multiprocessor system comprising:
N processors;
assigning means for assigning a priority to each of the multiple real-time threads to be executed on ones of the N processors, such that the multiple real-time threads include up to N top priority real-time threads; and
binding means for binding each of the up to top N priority real-time threads to a corresponding processor such that the assigned priority of each bound real-time thread is the highest priority for being executed on its corresponding processor and any other thread being executed on the corresponding processor is preempted if the bound real-time thread becomes runnable, wherein the binding means includes:
means for preallocating a processor to each one of the N top priority real-time threads; and
means for dispatching the bound real-time thread to its preallocated processor when the real-time thread becomes runnable.

14. The general purpose multiprocessor system of claim 13 further comprising a global queue, available for access by all of the N processors, for queuing unbound real-time threads not in the top N priority real-time threads if there is not available processors for the executing all real-time threads.

15. The general purpose multiprocessor system of claim 14 further comprising a time-share queue, available for access by all of the N processors, for queuing time-share threads if there are no available processors for the executing time-share threads, wherein the time-share threads in the time-share queue all have lower priorities than the unbound real-time threads in the global queue.

16. The general purpose multiprocessor system of claim 14 further comprising means for searching for an available processor for executing the unbound queued real-time threads.

17. The general purpose multiprocessor system of claim 13, wherein the binding means destroys one of the bound real-time threads and binds a highest priority unbound real-time thread in the general purpose multiprocessor system to said corresponding processor.

18. A general purpose multiprocessor system comprising:

N processors;

assigning means for assigning a priority to each of the multiple real-time threads to be executed on ones of the N processors, such that the multiple real-time threads include up to N top priority real-time threads; and binding means for binding each of the up to top N priority real-time threads to a corresponding processor such that the assigned priority of each bound real-time thread is the highest priority for being executed on its corresponding processor and any other thread being executed on the corresponding processor is preempted if the bound real-time thread becomes runnable;

wherein the assigning means assigns a priority to a new real-time thread and reevaluates the assigned priorities of the real-time threads to ascertain if the priority of the new real-time thread is greater than the priority of one of the previous top N priority real-time threads, and wherein if the priority of the new real-time thread is greater than the priority of one of the previous top N priority real-time threads, the binding means breaks the binding of the lowest priority bound real-time thread from its corresponding processor and binds the new real-time thread to said corresponding processor.

19. The general purpose multiprocessor system of claim 18, further comprising a global queue, available for access by all of the N processors, for queuing unbound real-time threads not in the top N priority real-time threads.

20. A general purpose multiprocessor system comprising:

N processors;

assigning means for assigning a priority to each of the multiple real-time threads to be executed on ones of the N processors, such that the multiple real-time threads include up to N top priority real-time threads; and binding means for binding each of the up to top N priority real-time threads to a corresponding processor such that the assigned priority of each bound real-time thread is the highest priority for being executed on its corresponding processor and any other thread being executed on the corresponding processor is preempted if the bound real-time thread becomes runnable;

wherein when the assigning means assigns a new priority to at least one of the real-time threads, wherein the assigning means reevaluates the assigned priorities of the real-time threads to ascertain if the priority of at least one unbound real-time thread is greater than the priority of at least one of the previous top N priority real-time threads as the result of the assigning, and wherein if the priority of the at least one unbound real-time thread is greater than the priority of the at least one of the previous top N priority real-time threads, the binding means breaks the binding of the at least one lowest priority bound real-time thread from its corresponding processor and binds the at least one unbound real-time thread to said corresponding processor.

21. The general purpose multiprocessor system of claim 20, further comprising a global queue, available for access by all of the N processors, for queuing unbound real-time threads not in the top N priority real-time threads.

* * * * *